(12) United States Patent
Le Nir et al.

(10) Patent No.: US 7,469,015 B2
(45) Date of Patent: Dec. 23, 2008

(54) SIGNAL TRANSMISSION MULTIPLE ANTENNA METHOD AND DEVICE

(75) Inventors: Vincent Le Nir, Rennes (FR); Maryline Helard, Rennes (FR); Rodolphe Le Gouable, Cesson-Sevigne (FR)

(73) Assignee: France Telecom, Paris (FR)

( * ) Notice: Subject to any disclaimer, the term of this patent is extended or adjusted under 35 U.S.C. 154(b) by 660 days.

(21) Appl. No.: 10/737,160

(22) Filed: Dec. 16, 2003

(65) Prior Publication Data

US 2005/0041751 A1 Feb. 24, 2005

(30) Foreign Application Priority Data

Dec. 16, 2002 (FR) .................................. 02 16200

(51) Int. Cl.
*H04B 7/02* (2006.01)
(52) U.S. Cl. ..................................................... 375/267
(58) Field of Classification Search ......... 375/130–140, 375/316, 295, 347, 299, 267, 259; 370/334; 455/101, 91, 39, 130, 403
See application file for complete search history.

(56) References Cited

U.S. PATENT DOCUMENTS

| | | | | |
|---|---|---|---|---|
| 5,056,112 | A * | 10/1991 | Wei | 375/280 |
| 6,317,411 | B1 * | 11/2001 | Whinnett et al. | 370/204 |
| 6,363,121 | B1 * | 3/2002 | Hochwald et al. | 375/260 |
| 2001/0036232 | A1 * | 11/2001 | Betts | 375/265 |
| 2003/0073464 | A1 * | 4/2003 | Giannakis et al. | 455/562 |
| 2003/0210750 | A1 * | 11/2003 | Onggosanusi et al. | 375/295 |
| 2004/0120300 | A1 * | 6/2004 | Saquib | 370/342 |

OTHER PUBLICATIONS

Tarokh et al. "Space-Time Block Codes from Orthogonal Designs", IEEE Transactions on Information Theory, vol. 45, No. 5, Jul. 1999, pp. 1456-1467.*
Zafar, MD et al. "Space-time Block Codes From Co-ordinate Interleaved Orthogonal Designs", Proceedings 2002 IEEE International Symposium on Information Theory, IEEE International Symposium on Information Theory, New York, NY: IEEE, US, Jun. 30, 2002, pp. 275, XP010601986.
Da Silva, M. M. et al. "Space Time Block Coding for 4 Antennas With Coding Rate 1", IEEE 7$^{th}$ Symposium on Spread Spectrum Tech & Application, vol. 2, Sep. 2-5, 2002, pp. 318-322, XP010615483.
Alamouti, S.M. "A Simple Transmit Diversity Technique for Wireless Communications", IEEE Journal on Selected Areas in Communications, IEEE, Inc., New York, NY, vol. 16, No. 8, Oct. 1998, pp. 1451-1458, XP002100058.
French Preliminary Search Report dated Sep. 1, 2003 for French Application No. 02 16200.

* cited by examiner

*Primary Examiner*—Mohammad Ghayour
*Assistant Examiner*—Vineeta S Panwalkar
(74) *Attorney, Agent, or Firm*—Stephen Bongini; Fleit Gibbons Gutman Bongini & Bianco P.L

(57) ABSTRACT

The invention lies within the field of wireless communications systems with several transmitting antennas, corresponding to MIMO (Multiple Input Multiple Output) systems or to MISO (Multiple Input Single Output) systems. According to the invention, the symbols to be transmitted are pre-encoded with a particular linear pre-encoding matrix then coded according to space-time block coding so as to benefit to the full from temporal and spatial diversities allowing at reception for particularly easy and efficient linear decoding.

11 Claims, 4 Drawing Sheets

SIGNAL TRANSMISSION MULTIPLE ANTENNA METHOD AND DEVICE

The invention lies within the field of wireless communications systems with several transmitting antennas, corresponding to MIMO (Multiple Input Multiple Output) systems or to MISO (Multiple Input Single Output) systems.

PRESENTATION OF THE STATE OF THE ART

It is common to use several transmitting antennas in wireless communications systems to reduce the effects of multiple path fading, and thus increase the service quality of the system. This technique is notably disclosed in the document [1] entitled "A simple transmit diversity technique for wireless communications" by S. M. Alamouti IEEE JSAC, Vol. 16, NO. 8, October 1998. In this document, Alamouti defines a space-time block coding allowing to fully exploit the spatial diversity in a system of two transmitting antennas and M receiving antennas. This encoding is illustrated in the attached FIGS. 1, 2a, 2b, 3a and 3b.

Figure 1:
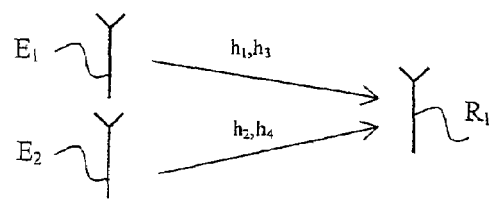

FIG. 1 shows a wireless communications system comprising two transmitting antennas, $E_1$ and $E_2$, and one receiving antenna $R_1$. Each of the transmitting antennas transmits a symbol during a temporal interval for a time period T hereafter named transmitting interval. For this transmitting of symbols, the fadings are considered as constant over two consecutive transmitting intervals. For Rayleigh channels, we therefore consider that the channel between the antennas $E_1$ and $R_1$ is equal to $h_1 = \alpha_1 e^{j\beta_1}$ during the first two transmitting intervals, noted $IT_1$ and $IT_2$, and to $h_3 = \alpha_3 e^{j\beta_3}$ during the following two transmitting intervals, noted $IT_3$ and $IT_4$. Likewise, the channel between antennas $E_2$ and $R_1$ is equal to $h2 = \alpha_2 e^{j\beta_2}$ during the intervals $IT_1$ and $IT_2$ and to $h_4 = \alpha_4 e^{j\beta_4}$ during the intervals $IT_3$ and $IT_4$.

The time-space block coding described in the document [1] applied to the symbols to be transmitted is given below for two instances:

transmitting of two symbols $s_1$ and $s_2$;

transmitting of four symbols $s_1$, $s_2$, $s_3$ and $s_4$.

In the first instance, the space-time coding of the document [1] consists in simultaneously transmitting, during the temporal interval $IT_1$, the symbols $s_1$ and $s_2$, then during the temporal interval $IT_2$, respectively the symbols $-s_2^*$ and $s_1^*$ from antennas $E_1$ and $E_2$. Each transmitting antenna transmits with a power of p/2.

Figure 2A:
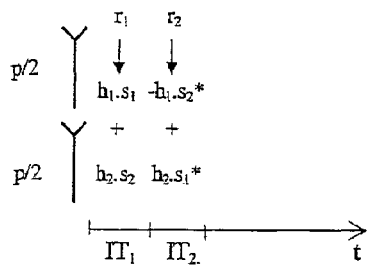

As FIG. 2a shows, if we ignore the noise during transmitting, the signals $r_1$ and $r_2$ received by the receiving antenna $R_1$, respectively during the interval $IT_1$ and the interval $IT_2$ are therefore:

$$r_1 = h_1 \cdot s_1 + h_2 \cdot s_2$$

$$r_2 = -h_1 \cdot s_2^* + h_2 \cdot s_1^*$$

where * is the operator of complex conjugations.

Figure 2B:
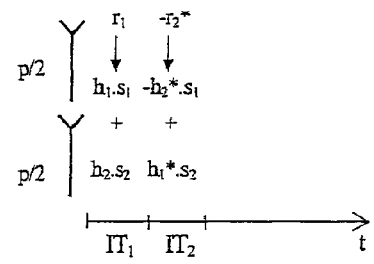

FIG. 2b is a virtual but equivalent linear representation of the space-time block coding in FIG. 2a. It is obtained by transforming $r_2$ into $-r_2^*$. The mathematical matrix representation of the space-time coding is thus the following:

$$[s_1 \ \ s_2] \cdot \begin{bmatrix} h_1 & -h_2^* \\ h_2 & h_1^* \end{bmatrix}$$

If, at reception, we apply to the received signals the decoding matrix $$\begin{bmatrix} h_1^* & h_2^* \\ -h_2 & h_1 \end{bmatrix}$$

transconjugated with the coding matrix $$\begin{bmatrix} h_1 & -h_2^* \\ h_2 & h_1^* \end{bmatrix},$$

we obtain:

$$[s_1 \ \ s_2] \cdot \begin{bmatrix} h_1 & -h_2^* \\ h_2 & h_1^* \end{bmatrix} \cdot \begin{bmatrix} h_1^* & h_2^* \\ -h_2 & h_1 \end{bmatrix}$$

that being $$[s_1 \ \ s_2] \cdot \begin{bmatrix} A & 0 \\ 0 & A \end{bmatrix} \text{ with } A = |h_1|^2 + |h_2|^2.$$

Given that the coding/decoding matrix $$\begin{bmatrix} A & 0 \\ 0 & A \end{bmatrix}$$

is a diagonal matrix, the transmitted symbols are very easy to detect at reception.

In the instance of a transmission of four symbols, $s_1$, $s_2$, $s_3$ and $s_4$, the latter are transmitted over four transmitting intervals. The transmitting diagram is as follows:

|  | $IT_1$ | $IT_2$ | $IT_3$ | $IT_4$ |
|---|---|---|---|---|
| Antenna $E_1$ | $s_1$ | $-s_2^*$ | $s_3$ | $-s_4^*$ |
| Antenna $E_2$ | $s_2$ | $-s_1^*$ | $s_4$ | $s_3^*$ |

Figure 3A:
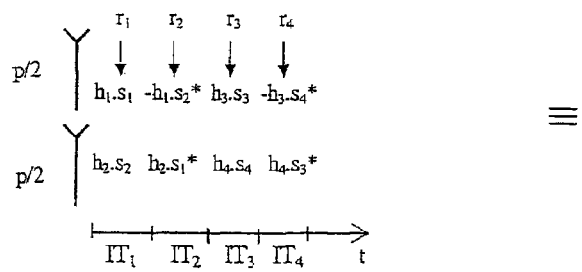

As shown in FIG. 3a, the signals $r_1$, $r_2$, $r_3$ and $r_4$ received by the receiving antenna $R_1$ respectively during the intervals $IT_1$, $IT_2$, $IT_3$ and $IT_4$, are then:

$$r_1 = h_1 \cdot s_1 + h_2 \cdot s_2$$

$$r_2 = -h_1 \cdot s_2^* + h_2 \cdot s_1^*$$

$$r_3 = h_3 \cdot s_3 + h_4 \cdot s_4$$

$$r_4 = -h_3 \cdot s_4^* - h_4 \cdot s_3^*$$

Figure 3B:
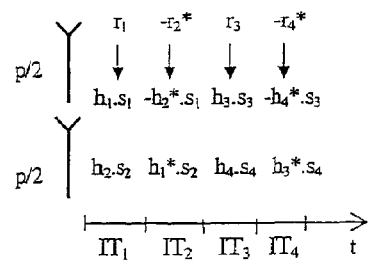

FIG. 3b is an equivalent linear representation of the space-time block coding in FIG. 3a. The space-time coding in FIG. 3b can be represented by following product of matrices:

$$[s_1 \; s_2 \; s_3 \; s_4] \cdot \begin{bmatrix} h_1 & -h_2^* & 0 & 0 \\ h_2 & h_1^* & 0 & 0 \\ 0 & 0 & h_3 & -h_4^* \\ 0 & 0 & h_4 & h_3^* \end{bmatrix}$$

If we apply, at reception, to this product of matrices the decoding matrix $$\begin{bmatrix} h_1^* & h_2^* & 0 & 0 \\ -h_2 & h_1 & 0 & 0 \\ 0 & 0 & h_3^* & h_4^* \\ 0 & 0 & -h_4 & h_3 \end{bmatrix},$$

we obtain:

$$[s_1 \; s_2 \; s_3 \; s_4] \cdot \begin{bmatrix} A & 0 & 0 & 0 \\ 0 & A & 0 & 0 \\ 0 & 0 & B & 0 \\ 0 & 0 & 0 & B \end{bmatrix}$$

with $A=|h_1|^2+|h_2|^2$ and $B=|h_3|^2+|h_4|^2$

Just as in the previous instance, given that the coding/decoding matrix is diagonal, it is very easy to detect at reception the transmitted symbols.

The main inconvenience of the space-time coding is that it can not be generalised to a system of more than two transmitting antennas.

Some authors, such as M. M. Da Silva and A. Corréia in their document [2] entitled "Space-time block coding for 4 antennas with coding rate 1", IEEE $7^{th}$ Int. Symp. On Spread-Spectrum Tech. And Appl., Prague, 2-5 September 2002, have defined a space-time coding for four transmitting antennas.

Figure 4:
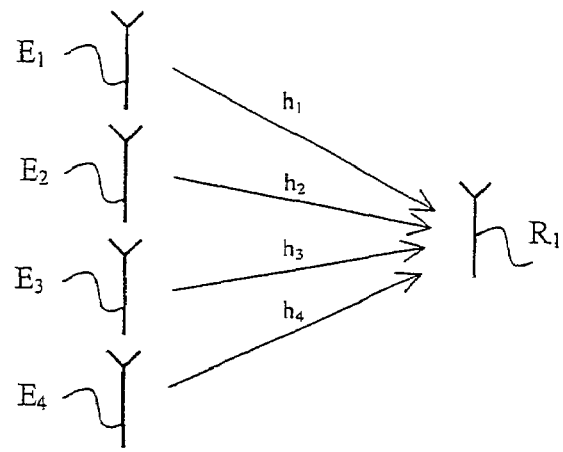

FIG. 4 shows a wireless communications system comprising four transmitting antennas, $E_1$, $E_2$, $E_3$ and $E_4$, and one receiving antenna, $R_1$, in which is applied the said coding.

The transmitting diagram described in the document [2] is the following:

|            | IT$_1$ | IT$_2$   | IT$_3$   | IT$_4$ |
|------------|--------|----------|----------|--------|
| Antenna E$_1$ | s$_1$  | −s$_2$*  | −s$_3$*  | s$_4$  |
| Antenna E2 | s$_2$  | s$_1$*   | −s$_4$*  | −s$_3$ |
| Antenna E3 | s$_3$  | −s$_4$*  | s$_1$*   | −s$_2$ |
| Antenna E$_2$ | s$_4$  | s$_3$*   | s$_2$*   | s$_1$  |

Figure 5A:
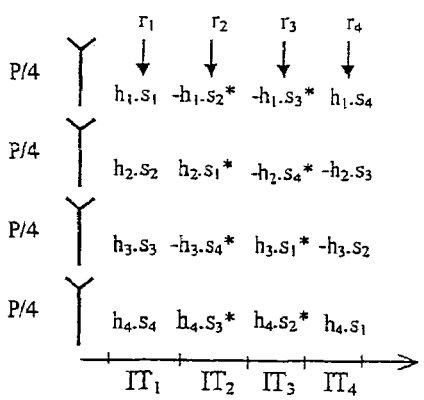
Figure 5B:
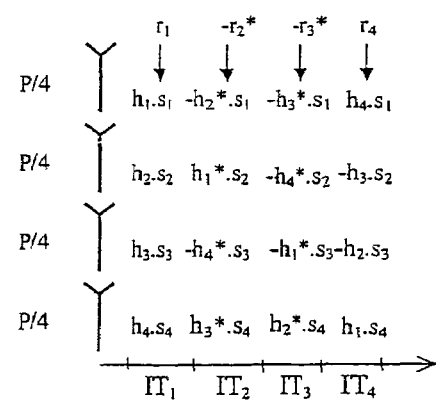

Each symbol is transmitted with a power p/4 on to each antenna and for each interval IT$_i$. As shown in FIG. 5a, if we ignore the noises during transmission, the signals $r_1$, $r_2$, $r_3$ and $r_4$ thus respectively received by the receiving antenna $R_1$ during the intervals IT$_1$, IT$_2$, IT$_3$ and IT$_4$, are:

$r_1 = h_1 \cdot s_1 + h_2 \cdot s_2 + h_3 \cdot s_3 + h_4 \cdot s_4$ $r_2 = -h_1 \cdot s_2^* + h_2 \cdot s_1^* - h_3 \cdot s_4^* + h_4 \cdot s_3^*$ $r_3 = -h_1 \cdot s_3^* - h_2 \cdot s_4^* + h_3 \cdot s_1^* + h_4 \cdot s_2^*$ $r_4 = h_1 \cdot s_4 - h_2 \cdot s_3 - h_3 \cdot s_2 + h_4 \cdot s_1$ FIG. 5b is an equivalent linear representation of the space-time block coding in FIG. 5a. The space-time coding in FIG. 5b can be represented by following product of matrices:

$$[s_1 \; s_2 \; s_3 \; s_4] \cdot \begin{bmatrix} h_1 & -h_2^* & -h_3^* & h_4 \\ h_2 & h_1^* & -h_4^* & -h_3 \\ h_3 & -h_4^* & -h_1^* & -h_2 \\ h_4 & h_3^* & h_2^* & h_1 \end{bmatrix}$$

If we apply, at reception, to this product of matrices the decoding matrix $$\begin{bmatrix} h_1^* & h_2^* & h_3^* & h_4^* \\ -h_2 & h_1 & -h_4 & h_3 \\ -h_3 & -h_4 & -h_1 & h_2 \\ h_4^* & -h_3^* & -h_2^* & h_1^* \end{bmatrix},$$

we obtain:

$$[s_1 \; s_2 \; s_3 \; s_4] \cdot \begin{bmatrix} A+B & 0 & 0 & In \\ h_2 & A+B & -In & 0 \\ 0 & -In & A+B & 0 \\ In & 0 & 0 & A+B \end{bmatrix}$$

with $In = 2 \cdot \mathrm{Re}\{h_1 \cdot h_4^* - h_2 \cdot h_3^*\}$

The coding/decoding matrix is no longer diagonal and has elements known as intersymbol interference elements. This interference is very strong and generally needs a detection of symbols with a maximum likelihood detection, complicated to implement. In order to best exploit the diversity, Da Silva and Corréia propose to pre-encode the symbols before their space-time coding.

For this purpose they propose the use of a complex orthonormal rotation matrix A8 defined in the following manner:

$$A_8 = \begin{bmatrix} A_4 & A_4 \\ A_4^* & -A_4^* \end{bmatrix} \Big/ 2\sqrt{2} \text{ with}$$

$$A_4 = \begin{bmatrix} e^{j\varphi} & -je^{j\varphi} & e^{j\varphi} & -je^{j\varphi} \\ -je^{-j\varphi} & e^{-j\varphi} & -je^{-j\varphi} & e^{-j\varphi} \\ e^{-j\varphi} & -je^{-j\varphi} & -e^{-j\varphi} & je^{-j\varphi} \\ je^{j\varphi} & e^{j\varphi} & -je^{j\varphi} & -e^{j\varphi} \end{bmatrix}$$

This pre-encoding allows to modify the global transmitting/receiving matrix of the symbols whilst maintaining the detection of the symbols via maximum likelihood detection.

One objective of the invention is to propose a method allowing to free from the detection of symbols by maximum likelihood detection at reception.

Another objective of the invention is to propose a method of transmitting symbols allowing to transmit with two transmitting antennas or more and to have at reception a simple detection of the transmitted symbols.

PRESENTATION OF THE INVENTION

According to the invention, these objectives are reached by performing a pre-encoding stage with a particular pre-encoding matrix allowing to obtain, at reception, a detection of the symbols by applying the inverse pre-encoding matrix.

The invention relates to a method of transmitting a signal composed of a plurality of symbols from $n_e$ transmitting antennas, $n_e$ being a whole number greater than or equal to 2, comprising the following stages:

- pre-encode the symbols to be transmitted so as to generate, for each burst of consecutive m symbols to be transmitted, m linear combinations of symbols, m being a whole number greater than or equal to $n_e$, the pre-encoding consisting in applying to each vector of m consecutive symbols to be transmitted a complex orthonormal pre-encoding matrix of dimension m×m so as to create the said m linear combinations of symbols; and
- for each burst of m consecutive symbols to be transmitted, code the said m linear combinations according to a space-time coding so as to transmit one after the other blocks of q coded linear combinations, q being a whole number smaller than or equal to m, each block of q coded linear combinations being transmitted from q' transmitting antennas, q' being a whole number greater than or equal to q, each of the coded linear combinations of the said block of q coded linear combinations being transmitted during q" consecutive temporal transmitting intervals specific to the said block from one of the said $n_e$ transmitting antennas, q" being a whole number greater than or equal to q.

If we use the space-time coding presented in document [1],

- the coded linear combinations are transmitted in blocks of two (q=2) during two consecutive time intervals (q"=2);
- the coded linear combinations are transmitted from $n_e$ antennas, $n_e$ ranging from 2 to m;
- each block of two linear combinations is transmitted from two transmitting antennas (q'=2);
- if $n_e$=m then each coded linear combination is transmitted from a transmitting antenna specific to it.

Advantageously, the method further comprises, prior to the space-time coding stage, a linear combination interleaving stage to modify the temporal order of the latter and thus increase the spatial diversity of the transmissions. The size of the matrix used to perform the interleaving is m'×m', m' being greater than or equal to m.

According to the invention, the pre-encoding stage consists in applying, to each vector of p consecutive symbols to transmit, a complex orthonormal pre-encoding matrix of dimension m×m so as to create the said m linear combinations of symbols. The said pre-encoding matrix is preferably a matrix or combination of matrices belonging to the Special Unitary group SU(m).

The said pre-encoding matrix can be the Kronecker product of a Hadamard matrix of order $$\frac{m}{k}$$

by a matrix of the Special Unitary group SU(k), k being a whole number greater than or equal to 2.

The matrix of the Special Unitary group SU(2) can be of type $$[SU(2)] = \begin{bmatrix} a & b \\ -b^* & a^* \end{bmatrix} = \begin{bmatrix} e^{i\theta_1}\cos\eta & e^{i\theta_2}\sin\eta \\ -e^{-i\theta_2}\sin\eta & e^{-i\theta_1}\cos\eta \end{bmatrix}$$

with $$\eta = \frac{\Pi}{4} + k'\frac{\Pi}{2}, \theta_1 = -\theta_2 + \frac{\Pi}{2} + k''\Pi \text{ and } \theta_2 = \theta_1 - \frac{\Pi}{2},$$

k' and k" being integers.

At reception, it is sufficient according to the invention to apply the inverse space-time coding matrix and the inverse pre-encoding matrix to find the transmitted symbols.

Thus the invention also relates to a method of receiving a signal comprised of a plurality of symbols transmitted from $n_e$ transmitting antennas, $n_e$ being greater than or equal to 2, with the aid of $n_r$ receiving antennas, $n_r$ being a whole number greater than or equal to 1, the said symbols being transmitted according to the previously defined method of transmitting, the method consisting in decoding the said m coded linear combinations received on each of the said $n_r$ receiving antennas by applying an inverse space-time coding stage and an inverse linear pre-encoding stage to those of the said method of transmitting so as to retrieve, from the said m coded linear combinations that were transmitted, the m transmitted symbols.

According to an alternative, the inverse pre-encoding stage consists in applying to the linear combinations derived from the inverse space-time coding a complex orthonormal inverse pre-encoding matrix, the m retrieved symbols corresponding to the results of the application of a global matrix with diagonal elements proportional to a sum of diagonal elements of a diagonal matrix, and with at least several non diagonal elements proportional to a difference between diagonal elements of the diagonal matrix, the other non diagonal elements being zero, the diagonal matrix corresponding to the transformation of the m linear combinations of symbols into the linear combinations derived from the inverse space-time coding.

The invention also relates to another method of receiving a signal composed of a plurality of symbols transmitted from $n_e$ transmitting antennas, $n_e$ being greater than or equal to 2, with the aid of $n_r$ receiving antennas, $n_r$ being a whole number greater than or equal to 1, the said symbols being transmitted according to an aforementioned method of transmitting with an interleaving, and consisting in decoding the said m coded linear combinations received on each of the said $n_r$ receiving antennas by applying an inverse space-time coding stage, an inverse interleaving stage and an inverse linear pre-encoding stage to those of the said method of transmitting so as to retrieve, from the said m coded linear combinations that were transmitted, the transmitted symbols.

According to an alternative, the inverse pre-encoding stage consists in applying to the linear combinations derived from the inverse space-time coding a complex orthonormal inverse pre-encoding matrix, the m retrieved symbols corresponding to the result of the application of a global matrix with diagonal elements proportional to a sum of diagonal elements of a diagonal matrix, and with non diagonal elements proportional to a difference between at least two diagonal elements of the diagonal matrix, the diagonal matrix corresponding to the transformation of the m linear combinations of symbols into the linear combinations derived from the inverse space-time coding and from the inverse interleaving stage.

The invention also relates to a wireless communications system comprising means of transmitting for implementing a method of transmitting symbols such as previously described.

According to an alternative, this system further comprises means for implementing a method of receiving symbols such as previously described.

Figure 6:
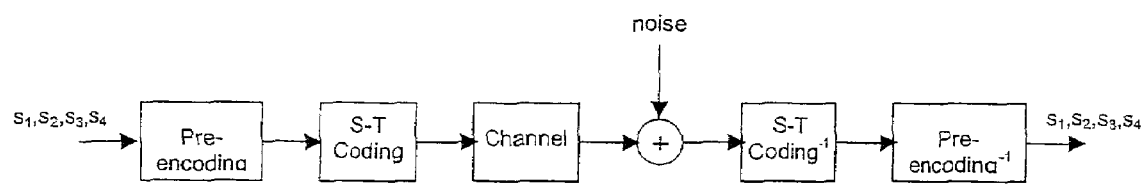
Figure 7A:
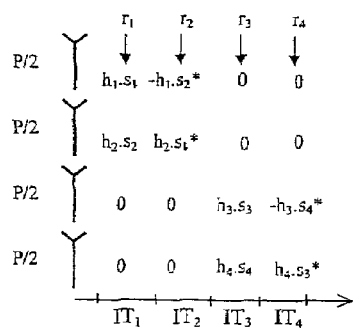
Figure 7B:
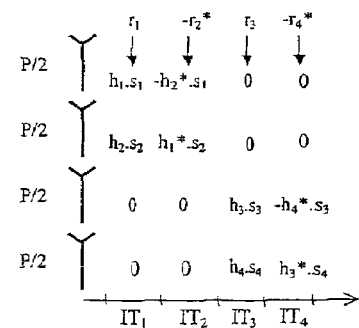
Figure 8:
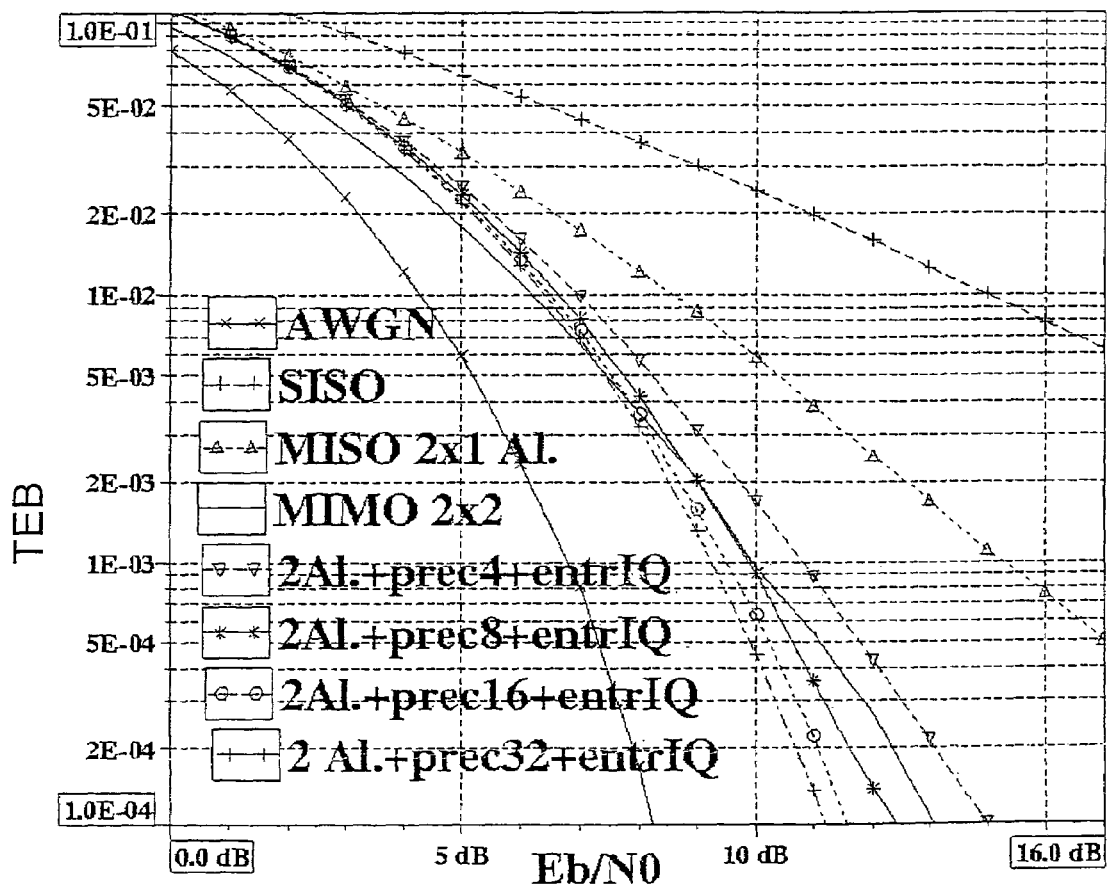

These characteristics and advantages of the invention, as well as others, will become clearer upon reading the following description, in conjunction with the annexed drawings, in which:

FIG. 1, already described, represents a wireless communications system with two transmitting antennas and one receiving antenna;

FIGS. 2a and 2b, already described, illustrate the transmission of two symbols in a system with two transmitting antennas according to a first known method;

FIGS. 3a and 3b, already described, illustrate the transmission of four symbols without pre-encoding in a system with two transmitting antennas according to the said first known method;

FIG. 4, already described, represents a wireless communications system with four transmitting antennas and one receiving antenna;

FIGS. 5a and 5b, already described, illustrate the transmission of four symbols in a system of four transmitting antennas according to a second known method;

FIG. 6 skeletally represents the operations of the method of transmitting and of the method of receiving according to the invention;

FIGS. 7a and 7b illustrate the transmission of four pre-encoded symbols in a system with two or four transmitting antennas according to the method of transmitting of the invention; and FIG. 8 illustrates the performance of the method of the invention in terms of bit error rate.

In the following description, $n_e$ and $n_r$ designate the number of transmitting antennas and the number of receiving antennas of the wireless communications system.

To simplify matters, we will first consider that $n_r=1$.

In reference to FIG. 6, the transmission consists in pre-encoding bursts of m symbols to be transmitted with a particular linear pre-encoding matrix then in coding the linear combinations derived from this pre-encoding operation according a space-time coding. At reception, the received symbols are decoded by applying the inverse space-time coding matrix and the inverse pre-encoding matrix.

The linear pre-encoding operation consists in applying to a burst of m symbols to be transmitted a linear pre-encoding matrix PREC belonging to the Special Unitary group SU(m).

To transmit for example bursts of four consecutive symbols, we use the following PREC matrix:

$$PREC = \frac{1}{\sqrt{2}} \begin{bmatrix} [SU(2)] & [SU(2)] \\ [SU(2)] & [-SU(2)] \end{bmatrix}$$

The matrices of the SU(2) group, noted above [SU(2)], are square matrices with a dimension of 2 bearing the following properties:

$$[SU(2)] = \begin{bmatrix} a & b \\ -b^* & a^* \end{bmatrix}$$

with det[SU(2)]=1 and where det[A] is the determinant of the matrix [A] and a, b are complex numbers; and $$[SU(2)]^{-1} = [SU(2)]^H = \begin{bmatrix} a^* & -b \\ b^* & a \end{bmatrix}$$

where $[SU(2)]^H$ is the transconjugated matrix of the matrix [SU(2)].

The pre-encoded PREC matrix, given above, which actually belongs to the SU(4) group, can be obtained by performing the Kronecker product of a Hadamard matrix $H_2$ of order 2 by a matrix [SU(2)]:

$$PREC = \frac{1}{\sqrt{2}} \begin{bmatrix} 1 & 1 \\ 1 & -1 \end{bmatrix} \otimes [SU(2)] = \frac{1}{\sqrt{2}} H_2 \otimes [SU(2)]$$

We then perform a space-time coding of the linear combinations of symbols derived from the pre-encoding stage. The method of the invention using the space-time coding of Alamouti (document [1]) will be illustrated hereafter. Other space-time codes such as the one disclosed in the document [3] entitled "Space-time block codes from orthogonal designs" by V. Tarokh, H. Jafarkhani and A. R. Calderbank, IEEE Transactions on Information Theory, Vol. 45, NO 5, 1999, pp. 1456-1467 can also be used.

With the Alamouti coding, the linear combinations are transmitted in blocks of two from the transmitting antennas of the system. The blocks of linear combinations are transmitted one after the other during two consecutive transmitting intervals from two transmitting antennas. Each of the linear combinations of the block is transmitted with an intensity p/2 from one of the two transmitting antennas associated with the said block.

For a system with four transmitting antennas, the linear combinations are transmitted for example in bursts of four symbols over four consecutive transmitting intervals as illustrated in FIG. 7a. The transmission diagram is summarised in the table below:

|  | $IT_1$ | $IT_2$ | $IT_3$ | $IT_4$ |
| --- | --- | --- | --- | --- |
| Antenna $E_1$ | $s_1$ | $-s_2^*$ | 0 | 0 |
| Antenna $E_2$ | $s_2$ | $s_1^*$ | 0 | 0 |
| Antenna $E_3$ | 0 | 0 | $s_3$ | $-s_4^*$ |
| Antenna $E_4$ | 0 | 0 | $s_4$ | $s_3^*$ |

Each symbol is transmitted with a power of p/2. These linear combinations can also be transmitted from two transmitting antennas instead of four. We would then come out with the transmission diagram in FIG. 3a in which the transmitted symbols are pre-encoded. In such an instance, the antennas $E_1$ and $E_3$ are one and the same antenna. Likewise, the antennas $E_2$ and $E_4$ are one and the same antenna.

If we ignore the noise during transmitting, the signals $r_1$, $r_2$, $r_3$ and $r_4$ received by the receiving antenna $R_1$, respectively during the intervals $IT_1$, $IT_2$, $IT_3$ and $IT_4$, are:

$$r_1 = h_1 \cdot s_1 + h_2 \cdot s_2$$

$$r_2 = -h_1 \cdot s_2^* + h_2 \cdot s_1^*$$

$$r_3 = h_3 \cdot s_3 + h_4 \cdot s_4$$

$$r_4 = -h_3 \cdot s_4^* - h_4 \cdot s_3^*$$

FIG. 7b is an equivalent linear representation of the space-time block coding in FIG. 7a. The space-time coding in FIG. 7b can be represented by the following matrix product:

$$[s_1 \ s_2 \ s_3 \ s_4] \cdot \begin{bmatrix} h_1 & -h_2^* & 0 & 0 \\ h_2 & h_1^* & 0 & 0 \\ 0 & 0 & h_3 & -h_4^* \\ 0 & 0 & h_4 & h_3^* \end{bmatrix}$$

After applying the inverse space-time coding matrix $$\begin{bmatrix} h_1^* & h_2^* & 0 & 0 \\ -h_2 & h_1 & 0 & 0 \\ 0 & 0 & h_3^* & h_4^* \\ 0 & 0 & -h_4 & h_3 \end{bmatrix}$$

and the inverse pre-encoding matrix $$PREC^{-1} = \frac{1}{\sqrt{2}} \begin{bmatrix} [SU(2)]^{-1} & [SU(2)]^{-1} \\ [SU(2)]^{-1} & [-SU(2)]^{-1} \end{bmatrix},$$

we obtain the following global matrix G:

$$G = PREC \cdot \begin{bmatrix} A & 0 & 0 & 0 \\ 0 & A & 0 & 0 \\ 0 & 0 & B & 0 \\ 0 & 0 & 0 & B \end{bmatrix} \cdot PREC^{-1}$$

$$= \frac{1}{2} \cdot \begin{bmatrix} A+B & 0 & A-B & 0 \\ 0 & A+B & 0 & A-B \\ A-B & 0 & A+B & 0 \\ 0 & A-B & 0 & A+B \end{bmatrix}$$

that being $$G = \frac{A+B}{2} I + J$$

where
I is the 4×4 identity matrix, and
matrix J is known as interference matrix, defined as:

$$J = \frac{1}{2} \cdot \begin{bmatrix} 0 & 0 & A-B & 0 \\ 0 & 0 & 0 & A-B \\ A-B & 0 & 0 & 0 \\ 0 & A-B & 0 & 0 \end{bmatrix}$$

Generally, the proportionality coefficient (in this instance ½) in the above equation defining the matrix G derives from the standardising of powers and from the multiplication of matrices depending on the size of the matrices to be multiplied.

Note that this matrical formulation applies to a system comprising two or four transmitting antennas.

The elements of the diagonal given by $$\frac{A+B}{2} = \frac{1}{2}(|h_1|^2 + |h_2|^2 + |h_3|^2 + |h_4|^2)$$

of the matrix G obey a law of $\chi_2^8$ (Rayleigh channels being independent between themselves). It is therefore very easy to retrieve the symbols at reception.

The intersymbol interference elements given by $$\frac{A-B}{2} = \frac{1}{2}(|h_1|^2 + |h_2|^2 - |h_3|^2 - |h_4|^2)$$

result from the difference of the two laws of $\chi_2^4$. These elements are therefore minimal and can be ignored at reception. Thus, the symbols are therefore directly detected after applying the inverse pre-encoding matrix. Detection by maximum likelihood could be used instead of the inverse pre-encoding stage. This would bring about slightly better results but would considerably increase the complexity of the receiver.

Values a and b of the matrix [SU(2)] are given by: $a = e^{j\theta_1} \cdot \cos\eta$ and $b = e^{j\theta_2} \cdot \sin\eta$. Some values $\eta$, $\theta_1$ and $\theta_2$ allow the reduction of the bit error rate during the transmitting of the symbols.

Preferably, we would choose $$\eta = \frac{\Pi}{4} + k'\frac{\Pi}{2}$$

in order to equitably balance the diversity exploited by the space-time coding of Alamouti and $$\theta_1 = -\theta_2 + \frac{\Pi}{2} + k''\Pi$$

to maximise the determinant of the matrix G and to minimise the interference elements. k' and k" are integers. Moreover, we have determined in an empirical manner that the best performances for bit error rates are obtained when $$\theta_2 = \theta_1 - \frac{\Pi}{2}.$$

In a preferred embodiment, we choose:

$$\eta = \frac{\Pi}{4}$$
$$\theta_1 = \frac{5\Pi}{4}$$
$$\theta_2 = \frac{3\Pi}{4}$$

The size of the pre-encoding matrix PREC can be extended to 8×8. The matrix PREC is then equal to:

$$PREC = \frac{1}{\sqrt{2}} H_4 \otimes [SU(2)]$$

where $H_4$ is the Hadamard matrix of order 4.

The space-time coding is then applied to two, four or eight transmitting antennas. The symbols to be transmitted are then pre-encoded in bursts of eight. The transmitting of the linear combinations of these eight symbols is performed over eight transmitting intervals.

The coding/decoding matrix is therefore the following:

$$\begin{bmatrix} A & 0 & 0 & 0 & 0 & 0 & 0 & 0 \\ 0 & A & 0 & 0 & 0 & 0 & 0 & 0 \\ 0 & 0 & B & 0 & 0 & 0 & 0 & 0 \\ 0 & 0 & 0 & B & 0 & 0 & 0 & 0 \\ 0 & 0 & 0 & 0 & C & 0 & 0 & 0 \\ 0 & 0 & 0 & 0 & 0 & C & 0 & 0 \\ 0 & 0 & 0 & 0 & 0 & 0 & D & 0 \\ 0 & 0 & 0 & 0 & 0 & 0 & 0 & D \end{bmatrix}$$

with $A=|h_1|^2+|h_2|^2$, $B=|h_3|^2+|h_4|^2$, $C=|h_5|^2+|h_6|^2$ and $D=|h_7|^2+|h_8|^2$ where $h_i$ represents the $i^{th}$ channel between one of the transmitting antennas and the receiving antenna (stable channel over two consecutive transmitting intervals).

The global matrix G is therefore the following:

Generally, in the absence of interleaving, the global matrix has several non diagonal elements different from zero as they are proportional to a difference between identical elements of the coding/decoding diagonal matrix.

The useful elements (that being those of the diagonal) obey a law of $\chi_2^{16}$.

For a pre-encoding matrix built on the same principle, we would by generalising:

| Pre-encoding matrix | Size of pre-encoding matrix | Diversity of the elements of the diagonal | Diversity of the interference elements |
|---|---|---|---|
| $H_2 \otimes SU(2)$ | 4 × 4 | $\chi_2^8$ | Diff. of $\chi_2^4$ |
| $H_4 \otimes SU(2)$ | 8 × 8 | $\chi_2^{16}$ | Diff. of $\chi_2^8$ |
| $H_2 \otimes SU(4)$ | 8 × 8 | $\chi_2^{16}$ | Diff. of $\chi_2^8$ |
| $H_{m/2} \otimes SU(2)$ | m × m | $\chi_2^{2m}$ | Diff. of $\chi_2^m$ |
| $H_{m/k} \otimes SU(k)$ | m × m | $\chi_2^{2m}$ | Diff. of $\chi_2^m$ |

As the product m increases, the law of $\chi_2^{2m}$ leans towards the gaussian law (central limit theorem) and the exploiting of the diversity is improved.

An important characteristic of the invention is that we can act in an independent manner on the number of transmitting antennas $n_e$ and on the size of the pre-encoding matrix m. A same size of pre-encoding matrix m×m can apply to different numbers of transmitting antennas, from 2 to m. In the example in FIG. 7a, we chose $m \geq 4$ and $n_e=4$.

For a modulation with $2^M$ states, the increase in the exploiting of the diversity increases in conjunction with the size of the pre-encoding matrix, with a complexity which increases with this size of matrix in $m^3$. By using a rapid Hadamard transformation we can transform this complexity into m·log(m).

If we use a maximum likelihood detector at reception, the complexity increases in $M^m$.

We can still improve the diversity of the system, by interleaving the linear combinations derived from the pre-encoding stage. An example of interleaving matrix ENT of dimension 8×8 is given below:

$$\begin{bmatrix} A+B+C+D & 0 & A-B-C+D & 0 & A+B-C-D & 0 & A-B+C-D & 0 \\ 0 & A+B+C+D & 0 & A-B-C+D & 0 & A+B-C-D & 0 & A-B+C-D \\ A-B+C-D & 0 & A+B+C+D & 0 & A-B-C+D & 0 & A+B-C-D & 0 \\ 0 & A-B+C-D & 0 & A+B+C+D & 0 & A-B-C+D & 0 & A+B-C-D \\ A+B-C-D & 0 & A-B+C-D & 0 & A+B+C+D & 0 & A-B-C+D & 0 \\ 0 & A+B-C-D & 0 & A-B+C-D & 0 & A+B+C+D & 0 & A-B-C+D \\ A-B-C+D & 0 & A+B-C-D & 0 & A-B+C-D & 0 & A+B+C+D & 0 \\ 0 & A-B-C+D & 0 & A+B-C-D & 0 & A-B+C-D & 0 & A+B+C+D \end{bmatrix}$$

$$ENT = \begin{bmatrix} 0 & 1 & 0 & 0 & 0 & 0 & 0 & 0 \\ 0 & 0 & 0 & 0 & 1 & 0 & 0 & 0 \\ 0 & 0 & 1 & 0 & 0 & 0 & 0 & 0 \\ 0 & 0 & 0 & 0 & 0 & 0 & 0 & 1 \\ 1 & 0 & 0 & 0 & 0 & 0 & 0 & 0 \\ 0 & 0 & 0 & 0 & 0 & 1 & 0 & 0 \\ 0 & 0 & 0 & 1 & 0 & 0 & 0 & 0 \\ 0 & 0 & 0 & 0 & 0 & 0 & 1 & 0 \end{bmatrix}$$

At reception, there is an interleaving dispensing stage between the inverse space-time coding stage and the inverse pre-encoding stage. The interleaving dispensing stage is performed with the aid of matrix $ENT_{-1} = ENT^T$ ($ENT^T$ is the transpose of ENT).

We then obtain:

$$ENT \cdot \begin{bmatrix} A & 0 & 0 & 0 & 0 & 0 & 0 & 0 \\ 0 & A & 0 & 0 & 0 & 0 & 0 & 0 \\ 0 & 0 & B & 0 & 0 & 0 & 0 & 0 \\ 0 & 0 & 0 & B & 0 & 0 & 0 & 0 \\ 0 & 0 & 0 & 0 & C & 0 & 0 & 0 \\ 0 & 0 & 0 & 0 & 0 & C & 0 & 0 \\ 0 & 0 & 0 & 0 & 0 & 0 & D & 0 \\ 0 & 0 & 0 & 0 & 0 & 0 & 0 & D \end{bmatrix} \cdot ENT^{-1} = \begin{bmatrix} A & 0 & 0 & 0 & 0 & 0 & 0 & 0 \\ 0 & C & 0 & 0 & 0 & 0 & 0 & 0 \\ 0 & 0 & B & 0 & 0 & 0 & 0 & 0 \\ 0 & 0 & 0 & D & 0 & 0 & 0 & 0 \\ 0 & 0 & 0 & 0 & A & 0 & 0 & 0 \\ 0 & 0 & 0 & 0 & 0 & C & 0 & 0 \\ 0 & 0 & 0 & 0 & 0 & 0 & B & 0 \\ 0 & 0 & 0 & 0 & 0 & 0 & 0 & D \end{bmatrix}$$

The global matrix (pre-encoding, interleaving, coding, inverse coding, interleaving dispensing, inverse pre-encoding) of the system then becomes:

$$G = \begin{bmatrix} [G_1] & [G_2] \\ [G_2] & [G_1] \end{bmatrix}$$

with $$[G_1] = \begin{bmatrix} A+B+C+D & j(A+B-C-D) & A-B+C-D & j(A-B-C+D) \\ -j(A+B-C-D) & A+B+C+D & -j(A-B-C+D) & A-B+C-D \\ A-B+C-D & j(A-B-C+D) & A+B+C+D & j(A+B-C-D) \\ -j(A-B-C+D) & A-B+C-D & -j(A+B-C-D) & A+B+C+D \end{bmatrix}$$

and $$[G_2] = \begin{bmatrix} 0 & 0 & 0 & 0 \\ 0 & 0 & 0 & 0 \\ 0 & 0 & 0 & 0 \\ 0 & 0 & 0 & 0 \end{bmatrix}$$

In the case of interleaving, the global matrix G has, generally speaking, several non diagonal elements different from zero as they are proportional to a difference between different elements of the diagonal matrix.

We therefore note that the interleaving allows to obtain a diversity of order $\chi_2^{16}$ on the diagonal instead of $\chi_2^8$ without interleaving.

| Interleaving | Size of pre-encoding matrix | Diversity of the elements of the diagonal | Diversity of the interference elements |
|---|---|---|---|
| $H_{m/k} \otimes SU(K)$ No | m × m | $\chi_2^{2m}$ | Diff. of $\chi_2^m$ |
| $H_{m/k} \otimes SU(K)$ Yes Size of the interleaving matrix m' × m' with m' ≧ m | m × m | $\chi_2^{4m}$ | Diff. of $\chi_2^{2m}$ |

The invention has only been described for a system with one receiving antenna. Of course, it can be applied to a system of $n_r$ receiving antennas.

The performances of the method of the invention are illustrated in FIG. 8 via curves of the bit error rate TEB in relation to the signal over noise ratio Eb/NO. This figure includes 8 curves:

AWGN: Gaussian Channel;

SISO: Transmission system with one transmitting antenna and one receiving antenna with a Rayleigh channel;

MISO 2×1 Al.: Transmission system with two transmitting antennas and one receiving antenna with a Rayleigh channel using a space-time block coding of Alamouti;

MISO 2×2: Transmission system with two transmitting antennas and two receiving antennas with a Rayleigh channel using a space-time block coding of Alamouti;

2 Al.+prec4+entrIQ: Transmission system with two transmitting antennas and one receiving antenna with a Rayleigh channel using a 4×4 pre-encoding matrix obtained from matrices SU(2) and an interleaving IQ (different interleaving in phase and in quadrature);

2 Al.+prec8+entrIQ: Transmission system with two transmitting antennas and one receiving antenna with a Rayleigh channel using a 8×8 pre-encoding matrix obtained from matrices SU(2) and an interleaving IQ (different interleaving in phase and in quadrature);

2 Al.+prec16+entrIQ: Transmission system with two transmitting antennas and one receiving antenna with a Rayleigh channel using a 16×16 pre-encoding matrix obtained from matrices SU(2) and an interleaving IQ (different interleaving in phase and in quadrature);

2 Al.+prec32+entrIQ: Transmission system with two transmitting antennas and one receiving antenna with a Rayleigh channel using a 32×32 pre-encoding matrix obtained from matrices SU(2) and an interleaving IQ (different interleaving in phase and in quadrature);

We can notice that if we increase the size of the pre-encoding matrix, we continually improve the exploiting of the diversity. Indeed, for a matrix of size 4×4, the performances are better than the known system of Alamouti. With larger matrix we even outperform a system with a diversity of optimal order 4 which is the MIMO 2×2 and this with an ever lower signal over noise ratio. This system with a diversity of optimal order 4 would correspond, if it existed, to the space-time coding with four antennas exploiting the maximum diversity.

The invention claimed is:

1. Method of transmitting a signal composed of a plurality of symbols from $n_e$ transmitting antennas, $n_e$ being a whole number greater than or equal to 2, the method comprising the steps of:

performing a linear pre-encoding operation on the symbols to be transmitted so as to generate, for each burst of m consecutive symbols to be transmitted, m linear combinations of symbols, m being a whole number greater than or equal to $n_e$, the linear pre-encoding operation consisting in applying to each vector of m consecutive symbols to be transmitted a complex orthonormal pre-encoding matrix of dimension m×m so as to create the m linear combinations of symbols, and for each burst of m consecutive symbols to be transmitted, coding the m linear combinations according to a space-time coding so as to transmit one after the other blocks of q coded linear combinations, q being a whole number smaller than or equal to m, each block of q coded linear combinations being transmitted from q' transmitting antennas, q' being a whole number greater than or equal to q, each of the coded linear combinations of the block of q coded linear combinations being transmitted during q'' consecutive temporal transmitting intervals specific to the block from one of the $n_e$ transmitting antennas, q'' being a whole number greater than or equal to q, wherein the pre-encoding matrix is the Kronecker product of a Hadamard matrix of order $\frac{m}{k}$ by a matrix of the Special Unitary group SU(k), k being a whole number greater than or equal to 2.

2. Method according to claim 1, wherein q, q' and q'' are equal to 2.

3. Method according to claim 2, wherein $n_e$ is equal to 2.

4. Method according to claim 1, wherein the number $n_e$ of transmitting antennas is equal to m, each coded linear combination being transmitted from a transmitting antenna specific to it.

5. Method according to any one of claims 1 to 4, further comprising the step of, prior to the step of coding the m linear combinations, interleaving the linear combinations to modify the temporal order of the latter.

6. Method according to claim 5, wherein the interleaving step is performed with the aid of an interleaving matrix of dimension m'×m', m' being greater than or equal to m.

7. Method according to claim 1, wherein the matrix of the Special Unitary group SU(2) is of type $$[SU(2)] = \begin{bmatrix} a & b \\ -b^* & a^* \end{bmatrix} = \begin{bmatrix} e^{i\theta_1}\cos\eta & e^{i\theta_2}\sin\eta \\ -e^{-i\theta_2}\sin\eta & e^{-i\theta_1}\cos\eta \end{bmatrix} \text{ with}$$

$$\eta = \frac{\Pi}{4} + k'\frac{\Pi}{2}, \theta_1 = -\theta_2 + \frac{\Pi}{2} + k''\Pi \text{ and } \theta_2 = \theta_1 - \frac{\pi}{2}, k'$$

and k'' being integers.

8. Method of receiving a signal comprised of a plurality of symbols transmitted from $n_e$ transmitting antennas, $n_e$ being greater than or equal to 2, the symbols being transmitted by:

performing a linear pre-encoding operation on the symbols to be transmitted so as to generate, for each burst of m consecutive symbols to be transmitted, m linear combinations of symbols, m being a whole number greater than or equal to ne, the linear pre-encoding operation consisting in applying to each vector of m consecutive symbols to be transmitted a complex orthonormal pre-encoding matrix of dimension m×m so as to create the m linear combinations of symbols, and for each burst of m consecutive symbols to be transmitted, coding the m linear combinations according to a space-time coding so as to transmit one after the other blocks of q coded linear combinations, q being a whole number smaller than or equal to m, each block of q coded linear combinations being transmitted from q' transmitting antennas, q' being a whole number greater than or equal to q, each of the coded linear combinations of the block of q coded linear combinations being transmitted during q'' consecutive temporal transmitting intervals specific to the block from one of the $n_e$ transmitting antennas, q'' being a whole number greater than or equal to q, the method of receiving comprising the steps of:

receiving the signal comprised of the plurality of symbols transmitted from the $n_e$ transmitting antennas with the aid of $n_r$ receiving antennas, $n_r$ being a whole number greater than or equal to 1, and decoding the m coded linear combinations received on each of the $n_r$ receiving antennas by performing an inverse space-time coding operation and an inverse linear pre-encoding operation so as to retrieve, from the m coded linear combinations that were transmitted, the m transmitted symbols, wherein the inverse linear pre-encoding operation consists in applying to the linear combinations derived from the inverse space-time coding operation a complex orthonormal inverse pre-encoding matrix, and the m retrieved symbols corresponding to the result of the application of a global matrix with diagonal elements proportional to a sum of diagonal elements of a diagonal matrix, and with at least several non diagonal elements proportional to a difference between diagonal elements of the diagonal matrix, the other non diagonal elements being zero, the diagonal matrix corresponding to the transformation of the m linear combinations of symbols into the linear combinations derived from the inverse space-time coding operation.

9. Method of receiving a signal composed of a plurality of symbols transmitted from $n_e$ transmitting antennas, $n_e$ being greater than or equal to 2, the symbols being transmitted by:

performing a linear pre-encoding operation on the symbols to be transmitted so as to generate, for each burst of m consecutive symbols to be transmitted, m linear combinations of symbols, m being a whole number greater than or equal to $n_e$, the linear pre-encoding operation consisting in applying to each vector of m consecutive symbols to be transmitted a complex orthonormal pre-encoding matrix of dimension m×m so as to create the m linear combinations of symbols, for each burst of m consecutive symbols to be transmitted, coding the m linear combinations according to a space-time coding so as to transmit one after the other blocks of q coded linear combinations, q being a whole number smaller than or equal to m, each block of q coded linear combinations being transmitted from q' transmitting antennas, q' being a whole number greater than or equal to q, each of the coded linear combinations of the block of q coded linear combinations being transmitted during q" consecutive temporal transmitting intervals specific to the block from one of the $n_e$ transmitting antennas, q" being a whole number greater than or equal to q, and prior to the step of coding the m linear combinations, interleaving the linear combinations to modify the temporal order of the latter, the method of receiving comprising the steps of:

receiving the signal composed of the plurality of symbols transmitted from the $n_e$ transmitting antennas with the aid of $n_r$ receiving antennas, $n_r$ being a whole number greater than or equal to 1, and decoding the m coded linear combinations received on each of the $n_r$ receiving antennas by performing an inverse space-time coding operation, an inverse interleaving operation and an inverse linear pre-encoding operation so as to retrieve, from the m coded linear combinations that were transmitted, the transmitted symbols, wherein the inverse linear pre-encoding operation consists in applying to the linear combinations derived from the inverse space-time coding operation a complex orthonormal inverse pre-encoding matrix, and the m retrieved symbols corresponding to the result of the application of a global matrix with diagonal elements proportional to a sum of diagonal elements of a diagonal matrix, and with non diagonal elements proportional to a difference between at least two diagonal elements of the diagonal matrix, the diagonal matrix corresponding to the transformation of the m linear combinations of symbols into the linear combinations derived from the inverse space-time coding operation and from the inverse interleaving operation.

10. Wireless communications system comprising:

means of transmitting a signal composed of a plurality of symbols from $n_e$ transmitting antennas, $n_e$ being a whole number greater than or equal to 2, wherein the means of transmitting includes:

means for performing a linear pre-encoding operation on the symbols to be transmitted so as to generate, for each burst of m consecutive symbols to be transmitted, m linear combinations of symbols, m being a whole number greater than or equal to $n_e$, the linear pre-encoding operation consisting in applying to each vector of m consecutive symbols to be transmitted a complex orthonormal pre-encoding matrix of dimension m×m so as to create the m linear combinations of symbols, and means for, for each burst of m consecutive symbols to be transmitted, coding the m linear combinations according to a space-time coding so as to transmit one after the other blocks of q coded linear combinations, q being a whole number smaller than or equal to m, each block of q coded linear combinations being transmitted from q' transmitting antennas, q' being a whole number greater than or equal to q, each of the coded linear combinations of the block of q coded linear combinations being transmitted during q" consecutive temporal transmitting intervals specific to the block from one of the $n_e$ transmitting antennas, q" being a whole number greater than or equal to q, and the pre-encoding matrix is the Kronecker product of a Hadamard matrix of order $$\frac{m}{k}$$

by a matrix of the Special Unitary group SU(k), k being a whole number greater than or equal to 2.

11. Wireless communications system according to claim 10, further comprising:

means for receiving the signal composed of the plurality of symbols transmitted from the $n_e$ transmitting antennas with the aid of $n_r$ receiving antennas, $n_r$ being a whole number greater than or equal to 1, wherein the means for receiving includes means for decoding the m coded linear combinations received on each of the $n_r$ receiving antennas by performing an inverse space-time coding operation and an inverse linear pre-encoding operation so as to retrieve, from the m coded linear combinations that were transmitted, the m transmitted symbols.

* * * * *

UNITED STATES PATENT AND TRADEMARK OFFICE
CERTIFICATE OF CORRECTION

| | | |
|---|---|---|
| PATENT NO. | : 7,469,015 B2 | Page 1 of 1 |
| APPLICATION NO. | : 10/737160 | |
| DATED | : December 23, 2008 | |
| INVENTOR(S) | : Vincent Le Nir et al. | |

It is certified that error appears in the above-identified patent and that said Letters Patent is hereby corrected as shown below:

Col. 16, Claim 8, line 42, change "ne" to --$n_e$--.

Signed and Sealed this

Twenty-fourth Day of February, 2009

JOHN DOLL
*Acting Director of the United States Patent and Trademark Office*